(12) United States Patent
Rao

(10) Patent No.: US 6,614,896 B1
(45) Date of Patent: Sep. 2, 2003

(54) ADVERTISING SYSTEM FOR CALLERS TO BUSY NUMBERS

(75) Inventor: Sanjay H. Rao, Apex, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/410,231

(22) Filed: Sep. 30, 1999

(51) Int. Cl.$^7$ ................................................ H04M 3/42
(52) U.S. Cl. ............................. 379/209.01; 379/210.01
(58) Field of Search ........................ 379/209.01, 210.01

(56) References Cited

U.S. PATENT DOCUMENTS

| | | | |
|---|---|---|---|
| 4,850,007 A | | 7/1989 | Marino et al. |
| 5,185,782 A | * | 2/1993 | Srinivasan .............. 379/207.03 |
| 5,311,574 A | * | 5/1994 | Livanos .................. 379/209.01 |
| 5,444,774 A | * | 8/1995 | Friedes ................... 379/266.01 |
| 5,448,625 A | * | 9/1995 | Lederman ................ 379/88.25 |
| 5,642,407 A | * | 6/1997 | He .......................... 379/142.15 |
| 6,035,031 A | * | 3/2000 | Silverman .............. 379/209.01 |
| 6,301,354 B1 | * | 10/2001 | Walker et al. .......... 379/265.02 |

FOREIGN PATENT DOCUMENTS

WO    WO 98/56154    12/1998

OTHER PUBLICATIONS

AT&T Bell Labs record titled "LASS: Putting the telephone customer in charge" By C. Brant Hirschman et al., May 1985.*

* cited by examiner

*Primary Examiner*—Ahmad F. Matar
*Assistant Examiner*—Rasha S Al-Aubaidi
(74) *Attorney, Agent, or Firm*—Withrow & Terranova, P.L.L.C.

(57) ABSTRACT

Advertising system for callers to busy numbers. When a call is received for a busy directory number the originator is notified and a determination is made as to whether the originator would like to activate an automatic callback feature. If the originator has activated the feature the call is forwarded to an advertisement server and the directory number is monitored. When the called directory number is free the originator is connected. In effect, an automatic callback service is provided free of charge to a caller, the revenues from the advertising paying for the service. The invention can be implemented either with an automatic callback facility or by using advanced intelligent network triggers. Computer program code within a telecommunication switch is used to implement the invention.

19 Claims, 3 Drawing Sheets

ADVERTISING SYSTEM FOR CALLERS TO BUSY NUMBERS

BACKGROUND

1. Field of the Invention

This invention is related to the use of advertising to pay for telecommunication services. In particular, this invention is related to the use of advertising to pay for an automatic callback feature for busy directory numbers.

2. Description of the Problem

Telecommunication today on the Public Switched Telephone Network (PSTN), is marked by the proliferation of numerous services to provide convenience to users. Among these services is automatic callback, through which a caller to a busy directory number (DN) can have the number monitored. When the DN becomes free, the originator of the call is automatically called back by the PSTN. When the originator picks up the callback, the DN which was called is rung. In this scenario, a PSTN switch between the originator and the telephone associated with the DN offers to keep trying the busy number for an additional cost.

FIG. 1 illustrates how the automatic callback feature works. According to FIG. 1, a caller or originator, 110, attempts to call equipment, 114, associated with a busy DN. End office switch 112 serves the telephone equipment, 114, associated with the busy DN. At 101 the caller dials the called party DN. At 102 and 103 the switch attempts to establish a connection with the called party DN and receives an indication that the called party is busy, or that the telephone that the called party is using is off-hook. At 104 the end office switch plays a message asking the caller if the caller would like to be notified when the called party becomes idle. If the caller accepts, the end office switch, 112, activates a feature called automatic callback (ACB). ACB is defined for POTS (plain old telephone system) in Telcordia (formerly BELCORE) standard TR-NWT-000215, Issue 3, June 1993, and for ISDN (integrated services digital network) in Telcordia standard TR-NWT-000855, Issue Jun. 3, 1993, both of which are widely distributed and available from many technical libraries, or can be ordered from Telcordia Technologies, Inc. The ACB facility monitors the line state of the telephone line associated with the called DN to determine if the line is busy or idle. When the called party becomes idle, the caller is notified and a call is established between the two agents.

The automatic callback feature, while extremely useful and beneficial, is under-utilized because many users of the PSTN do not want to pay the fee associated with the use of the feature. Telephone companies do not wish to provide the feature for free and forfeit the revenue currently realized through collecting charges for the feature. The use of advertising to pay for goods and services is already well known. In addition the idea of targeting advertising to users of the Public Switch Telephone Network is known. International patent application number PCT/US98/08087, published on Dec. 10, 1998, under the publication number WO 98/56154 discusses the targeting of advertising to users of a telecommunication network. What is needed is a way to pay for automatic callback service through the use of advertising, so that users do not have to pay for the service and telephone companies still realize revenue from providing the service.

SUMMARY

The present invention meets the above needs by providing an advertising system for users of the PSTN. Using the present invention, a caller to a busy DN is provided with the option of listening to advertising messages while waiting for a switch which serves the called DN to try the called number and make a connection when the called number is no longer busy. The provider of the telephone services for the caller sells advertising time on the service to maintain a revenue stream from providing the automatic callback service.

According to the present invention a switch which is implementing the service first receives a call from the originator which is destined for a directory number which is busy. The switch notifies the originator of the busy directory number and determines if the originator has activated the automatic callback feature according to the invention. If the originator has activated the feature, the call is forwarded to an advertisements server and the DN is monitored. When the DN is no longer busy the originator is connected. According to one embodiment of the invention the call is processed using the automatic callback (ACB) facility. According to another embodiment of the invention the call is processed using an advanced intelligent network (AIN) trigger.

The invention is typically implemented using a computer program product for the equipment involved. A computer program product includes a media with computer program code which causes the systems involved to perform the necessary operations. A switch which implements the invention includes a switching matrix, one or more peripheral modules connected to the switching matrix, one or more input/output devices connected to the switching matrix, and a processor core which controls the operation of the switch and, during operation, contains the computer program code which implements the invention.

The telecommunication network in which the invention operates includes the originator customer premises equipment, the destination customer premises equipment (CPE) which is associated with the called DN, and one or more switches disposed between the originator and destination CPE. At least one of the one or more switches includes the computer program code which implements the invention. Usually, the invention will be implemented at the end office switch. An advertisements server which contains the audio advertisements stored on a media, is connected to the switch which implements the invention. Where AIN is used to implement the invention, the switch is also connected to a service control point (SCP).

DETAILED DESCRIPTION

Figure 1:
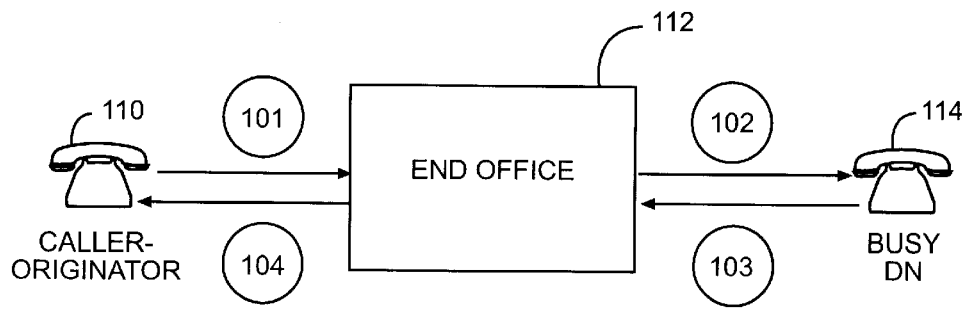
FIG. 1 is a network diagram showing the network and messaging of the prior art.
Figure 2:
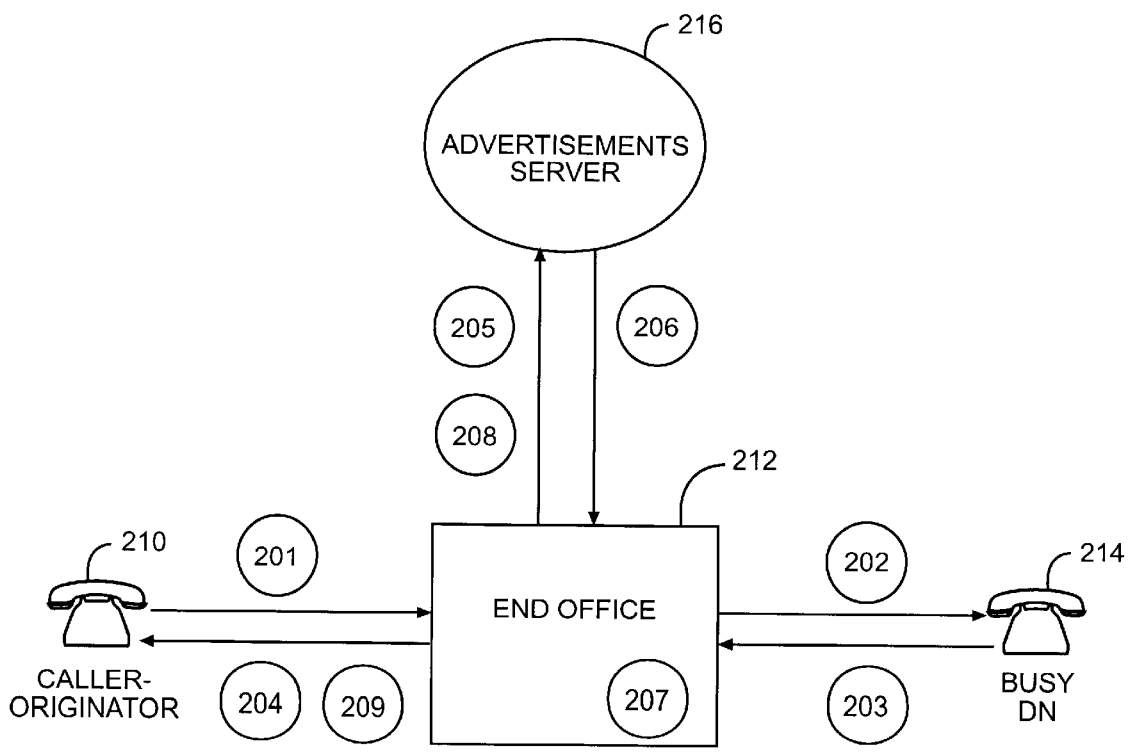
FIG. 2 is a network diagram showing the operating environment and messaging according to one embodiment of the present invention.

FIG. 2 illustrates the operation of the invention according to one embodiment. According to FIG. 2, a caller or originator, 210, is connected to end office switch 212 which is in turn connected to equipment associated with a called directory number (DN), 214. As a practical matter end office switch 212 is only directly connected to the originator 210 if both the originator and the called DN are served by the same switch. However the operation of the invention is the same regardless of whether there are intervening switches between end office switch 212 and the caller, 210. The additional switches are omitted for simplicity. An advertisement server, 216, is also connected to the network. The reference numbers in circles illustrate the various steps in the processing required to implement the invention.

At 201 the caller dials the called party DN. The switch attempts to establish a connection with the called party at 202 and receives a busy indication at 203. There are numerous ways in which PSTN switches determine and keep track of which DN's are busy and which are free. In some cases the switch maintains a busy/idle map of all lines. The map is dynamically updated and is stored in the switch's memory. Some switches use messaging between the computing module or processor core and the various peripheral devices within the switch to determine if a line is busy.

At 204 a busy announcement is transmitted to the caller and the caller is asked if they wish to listen to advertisements and be automatically connected to the called DN when the called DN becomes free. In this embodiment, when using a traditional or (POTS) telephone the user indicates his or her willingness to listen to advertisements in return for activating the automatic callback feature through a touch-tone code entered at the telephone terminal. It is also possible to use voice recognition to provide input. Other options such as using telephones with special text messaging capabilities or with full alpha-numeric keyboards can be implemented. When the user selects the feature, the call is forwarded to an advertisement server at 205. Advertisements are played back to the user at 206. All the while, a feature inside the switch, 207, is monitoring the status of the called DN. As soon as the called party becomes idle the feature inside the switch signals the advertisement server to release the call at 208. The caller is notified at 209 via an announcement that the called party is idle and the called party and calling party are connected. In the present embodiment of the invention, the feature in the switch which monitors the busy status of the DN and forwards the call to the advertisement's server is the automatic callback (ACB) facility.

The advertisement's server which is used with the present invention will typically be implemented on a workstation or computer having sufficient storage media to store all of the various advertising messages. The advertisement's server can be interfaced with the switch in many ways. If the switch is an Integrated Services Digital Network (ISDN) switch, the interface will probably be a primary rate interface (PRI) trunk. In this case, the signaling used will follow the well-known international telecommunication's union (ITU) Q.931 standard. The interface can also be an ISDN user part (ISUP) trunk which implements messaging via a signaling system 7 (SS7) network. In a telephony network using voice over internet protocol architecture the advertisements server may be connected through a gateway using ITUH.323 signaling, or a similar voice over IP type of signaling.

Figure 3:
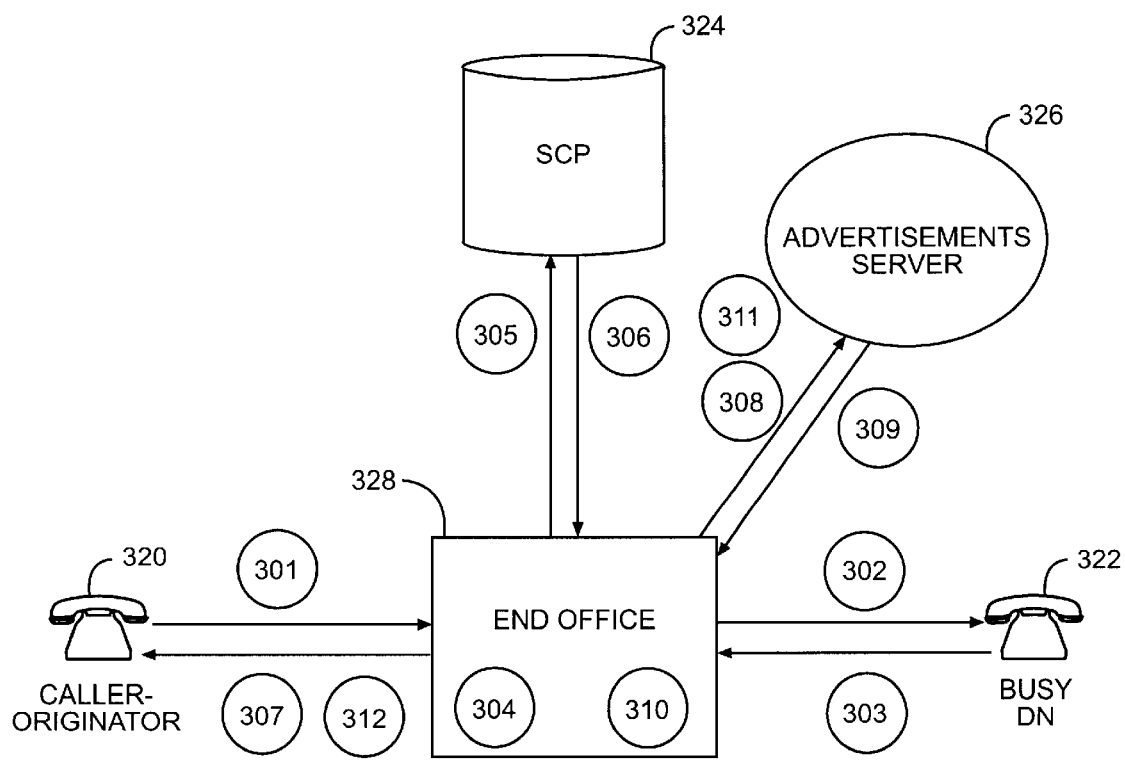
FIG. 3 is a network diagram showing the operating environment and the messaging according to another embodiment of the present invention.

FIG. 3 illustrates another embodiment of the present invention. In FIG. 3 the caller is represented by customer premises equipment (CPE), 320. The caller CPE is connected to end office switch 328 which is in turn connected to telephone equipment 322 associated with the called, busy DN. As before switch 328 is connected to the advertisement server, 326. Switch 328 is also connected to a service control point (SCP), 324, which is further explained below. Also as before, reference numbers and circles indicate steps in the processing which is necessary to carry out the invention.

In the embodiment of FIG. 3, advanced intelligent network (AIN) triggers are used to implement the automatic callback feature. With AIN, a signaling network is disposed in parallel with the telecommunication network which carries voice and/or data traffic. In such a network a switch serves as a service switching point, or SSP. A service switching point processes AIN triggers. Most typically, the signaling system 7 (SS7) protocol is used to exchange information on the AIN. Databases containing information used to respond to queries which are triggered at an SSP are contained in a service control point (SCP). A trigger is a process that identifies calls that need AIN processing. When encountering a trigger, an SSP suspends normal call processing and sends a query. Such a trigger can be used to implement the present invention.

In this embodiment the invention uses a T_BUSY trigger for residential lines. In this case the originating agent, the caller, attempts to call a terminating agent which is busy. The end office switch which serves the terminating agent is enabled to process the T_BUSY trigger. Turning again to FIG. 3, at 301 the originator dials the terminator DN. The end office, 328, attempts to establish a connection with the called party at 302 and determines at 303 that the called party is busy. The T_BUSY trigger is detected. The calling party does not hear a busy indication at this point. The T_BUSY trigger causes a query to be sent to the SCP at 305. The end office switch still does not provide the busy indication to the calling party, but rather waits for instructions from the SCP. At 306 the SCP sends a response message to the switch with instructions on how to process the call. In the present embodiment the response directs the end office switch to determine if the caller or originator wishes to activate the automatic callback feature at 307. If so the call is then forwarded to the advertisement server, 326, at step 308. The advertisement server is connected to the end office switch through any of the same interfaces previously described, including ISUP, SS7, or H.323. Advertisements are now played to the caller at 309.

The switch monitors the state of the busy DN at 310. As soon as the called party becomes free the switch signals the advertisement server to release the call at 311. The user is notified at 312 that the called party is idle and the two agents are connected.

Figure 4:
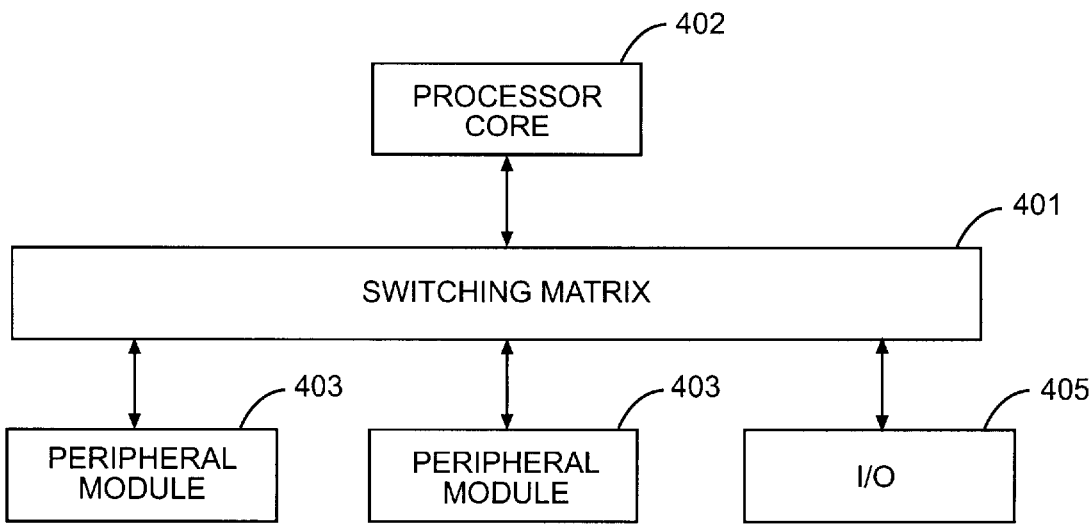
FIG. 4 is a block diagram of a telecommunication switch which implements some aspects of the present invention.

FIG. 4 illustrates a conceptual, functional block diagram of a switch which implements the invention. Processor core 402 includes a central processing unit memory and supporting circuitry. In some switch architectures the processor core is called the computing module. This processor core, together with any computer program code stored in memory is the means for controlling the overall operation of the switch. Switching matrix 401 allows the processing core to communicate with the other components. The switching matrix, 401, includes one or more buses and accompanying internal circuitry. Input/Output (I/O) module 605 is also connected to the switching matrix and includes removable media devices to load computer program code. The I/O module also includes devices for connection to work stations and similar equipment. The peripheral modules, 603, are connected to the switching matrix, 601, and are managed by the processor core, 602. The peripheral modules, 603, provide an interface to various networks including various types of line interfaces, as well as interfaces to CPE. It should be noted that the computer program code which implements the invention can be stored and executed within the switch itself, or in another device. For example some of the computer program code could be stored and executed by the advertisement's server, or by an auxiliary device connected to the switch via the AIN.

Figure 5:
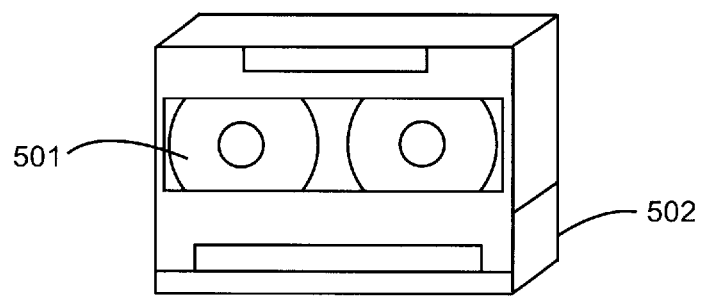
FIG. 5 illustrates a media on which computer program code which implements the present invention is stored.

Appropriate computer code in combination with hardware implements many of the elements of the present invention. The computer program code is often stored on a storage media. This media can be a diskette, hard disk, CD-ROM, or tape. The media can also be a memory storage device or collection of memory storage devices such as read-only memory (ROM) or random access memory (RAM). Additionally, the computer code can be transferred to the switch over some type of data network. FIG. 5 illustrates one example of a media. FIG. 5 shows a tape cartridge of the type where magnetic media 501 is enclosed in a protective cassette, 502. Magnetic field changes over the surface of the magnetic media, 501, are used to encode the computer program code. In this way the computer program code is stored for transport and later retrieval.

It should be noted that because computer program code is used to implement the invention, there is an infinite variety of ways to handle specific details of the invention. There are also numerous types of switching systems in use, any one of which could be adapted and programmed to implement the invention. Although I have described specific embodiments of the invention, the description is not intended to limit the applicability of the following claims.

I claim:

1. A method of presenting advertising to an originator of a call, said advertising originating from a third party distinct from the originator and a called party, the method comprising the steps of:

receiving a call from the originator, the call destined for a directory number (DN) of the called party which is busy;

notifying the originator as to the busy directory number and determining if the originator has activated an automatic callback feature;

if the originator has activated the automatic callback feature, forwarding the call to an advertisements server associated with the third party and monitoring the DN; and connecting the originator to the DN when the DN is no longer busy.

2. The method of claim 1 wherein the call is processed using an automatic callback (ACB) facility.

3. The method of claim 1 wherein the call is processed using an advanced intelligent network (AIN) trigger which causes a query to a service control point (SCP).

4. Apparatus for presenting advertising to an originator of a call, said advertising originating from a third party distinct from the originator and a called party, the apparatus comprising:

means for receiving a call from the originator, the called destined for a directory number (DN) of the called party which is busy;

means for notifying the originator as to the busy directory number and determining if the originator has activated an automatic callback feature;

means for forwarding the call to an advertisements server associated with the third party and monitoring the DN; and means for connecting the originator to the DN when the DN is no longer busy.

5. The apparatus of claim 4 wherein the call is processed using an automatic callback (ACB) facility.

6. The apparatus of claim 4 wherein the call is processed using an advanced intelligent network (AIN) trigger which causes a query to a service control point (SCP).

7. A telecommunication switch including a processing core for controlling the switch to present advertising to an originator of a call, said advertising originating from a third party distinct from the originator and a called party, the processing core containing a computer program comprising:

computer program code for receiving a call from the originator, the call destined for a directory number (DN) of the called party which is busy;

computer program code for notifying the originator as to the busy directory number and determining if the originator has activated an automatic callback feature;

computer program code for forwarding the call to an advertisements server associated with the third party and monitoring the DN; and computer program code for connecting the originator to the DN when the DN is no longer busy.

8. The switch of claim 7 wherein the call is processed using an automatic callback (ACB) facility.

9. The switch of claim 7 wherein the call is processed using an advanced intelligent network (AIN) trigger which causes a query to a service control point (SCP).

10. A network in which advertising is presented at originator customer premises equipment (CPE) from a third party distinct from the originator and a called party for a call to a busy directory number (DN) of the called party, the network comprising:

the originator CPE adapted to activate an automatic callback feature;

destination CPE which is associated with the busy DN;

one or more switches disposed between the originator CPE and the destination CPE, at least one of the one or more switches including computer program code for forwarding the call to an advertisements server associated with the third party upon determination of activation of the automatic callback feature, and monitoring the DN, and connecting the originator CPE to the DN when the DN is no longer busy; and the advertisements server associated with the third party connected to the one or more switches and receiving the forwarded call.

11. The network of claim 10 further comprising a service control point (SCP) connected to the one or more switches, the service control point for responding to queries initiated by advanced intelligent network (AIN) triggers.

12. The method of claim 1 farther comprising providing, to the originator, an option of connecting to the advertisements server.

13. The method of claim 12 wherein forwarding the call to the advertisements server is a result of a decision by the originator to activate the automatic callback feature as a result of said providing, to the originator, an option of connecting to the advertisements server.

14. The method of claim 1 wherein the originator exchanges listening to advertisements on the advertisements server for the ability to use the automatic callback feature.

15. The apparatus of claim 4 wherein said means for forwarding the call to an advertisements server operates if said determining means determines that the originator activated the automatic callback feature.

16. The apparatus of claim 4 further comprising means for providing, to the originator, an option of connecting to the advertisements server.

17. The apparatus of claim 4 wherein the originator exchanges listening to advertisements on the advertisements server for the ability to use the automatic callback feature.

18. The telecommunications switch of claim 7 wherein the originator exchanges listening to advertisements on the advertisements server for the ability to use the automatic callback feature.

19. The network of claim 10 wherein the originator exchanges listening to advertisements on the advertisements server for the ability to use the automatic callback feature.

* * * * *